United States Patent
Date

(10) Patent No.: US 7,864,811 B2
(45) Date of Patent: Jan. 4, 2011

(54) TELECOMMUNICATIONS CONTROL DEVICE AUTONOMOUSLY DETERMINING TRANSMISSION TIMING AND A METHOD THEREFOR

(75) Inventor: Masaaki Date, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 311 days.

(21) Appl. No.: 12/155,790

(22) Filed: Jun. 10, 2008

(65) Prior Publication Data

US 2008/0310459 A1    Dec. 18, 2008

(30) Foreign Application Priority Data

Jun. 18, 2007  (JP) .............................. 2007-160231

(51) Int. Cl.
  *H04J 3/06* (2006.01)
(52) U.S. Cl. ....................................... 370/503; 370/350
(58) Field of Classification Search ......... 370/503–520, 370/350; 375/294, 327, 362, 371, 373, 375, 375/376; 713/375, 500–503, 600, 601; 455/502, 455/265

See application file for complete search history.

(56) References Cited

U.S. PATENT DOCUMENTS 6,757,253 B1 *  6/2004  Cooper et al. ............... 370/241

| | | |
|---|---|---|
| 2005/0190796 A1 | 9/2005 | Date et al. |
| 2006/0050826 A1 | 3/2006 | Date et al. |
| 2006/0114840 A1 | 6/2006 | Date et al. |
| 2006/0114841 A1 | 6/2006 | Date et al. |
| 2006/0171409 A1 | 8/2006 | Date et al. |
| 2006/0171421 A1 | 8/2006 | Matsunaga et al. |

\* cited by examiner

*Primary Examiner*—Derrick W Ferris
*Assistant Examiner*—Jose Villa
(74) *Attorney, Agent, or Firm*—Rabin & Berdo, P.C.

(57) ABSTRACT

A network node constituting a telecommunications system together with one or more neighboring nodes includes a telecommunications control device, which includes a timing control signal receiver for receiving timing control signals transmitted from the neighboring nodes, and a transmission timing calculator for determining data transmission timing of the network node, based on reception timing of the timing controls signal of the neighboring nodes. The device further includes a timing control signal transmitter for transmitting a timing control signal with a phase indicative of data transmission timing of the network node reflected, a data communicator for transmitting and receiving a data signal to and from the neighboring nodes, and a phase state manager for controlling transmission of the timing control signal and data signal in accordance with the phase state of the network node.

9 Claims, 5 Drawing Sheets

TELECOMMUNICATIONS CONTROL DEVICE AUTONOMOUSLY DETERMINING TRANSMISSION TIMING AND A METHOD THEREFOR

BACKGROUND OF THE INVENTION

1. Field of the Invention

The present invention relates to a telecommunications control device, and more particularly to a telecommunications control device applicable to a telecommunications network system, such as a sensor network, a wireless ad hoc network, a local area network (LAN), or other kinds of network, including a plurality of nodes dispersedly disposed or mounted on mobile bodies to send data to each other while avoiding a collision of data due to radio interference, etc. The present invention also relates to a telecommunications control method therefor.

2. Description of the Background Art

A method of avoiding a collision of data by allowing each of a plurality of nodes to adjust its own transmission timing autonomously without resorting to a central administrative server is disclosed by U.S. patent application publication Nos. US 2005/0190796 A1 to Date et al., US 2006/0050826 A1 to Date et al., US 2006/0114841 A1 to Date et al., US 2006/0114840 A1 to Date et al., US 2006/0171409 to Date et al., and US 2006/0171421 A1 to Matsunaga et al., by way of example.

In the telecommunications control devices and methods taught in the six patent publications set forth above, each node transmits and receives an impulse signal, which is a control signal indicative of the data transmission timing of its own node, periodically to and from its neighboring nodes, thereby adjusting its own transmission timing mutually. This enables an autonomous time slot allocation. More specifically, the time interval of one period (transmission period of an impulse signal) is divided into time slots, which are allocated to nodes lying within a signal range in which impulse signals can be transmitted and received. Note that an impulse signal does not always need to be formed in the form of impulse-shaped signal. It may be constituted by packets etc., as with control signals. Hence, an impulse signal is also called a timing control signal. The transmission period of a timing control signal will hereinafter be referred to simply as a period. The range of a timing control signal transmitted by each node corresponds to an interaction range in which that node performs an adjustment of transmission timing.

There are several solutions of transmitting and receiving a timing control signal between neighboring nodes. In the first solution, as shown in FIG. 2A, nodes, e.g. a node i of interest, are arranged to have the signal range Ci thereof within which the timing control developed therefrom is available broader than the signal range Di within which a data signal developed therefrom is available. For instance, the former may be set about twice as broad as the latter by adjusting the ratio in transmission power of a timing control signal to a data signal. That intends to avoid a collision of data that would otherwise occur due to a hidden node, etc.

In the second solution, as shown in FIG. 2B, nodes, e.g. a node of interest i, have the timing control signal range Ci and data signal range Di thereof formed the same, i.e. the same in transmission power, and the node of interest generates a virtual phase with respect to another node, corresponding to a virtual phase described in the aforementioned '480 Date et al. patent, based on a timing control signal received from the other to transmit the virtual phase along with the timing control signal of the node of interest.

The other node, e.g. a node included in a solid-line circle 21, FIG. 2B, works, when having received a timing control signal from the node of interest i, so as to generate a virtual phase of the own node if not exist within itself, or adjust the value of a virtual phase when already exists. Thereafter, the value of the generated or adjusted virtual phase varies at a constant rate equivalent to the specific angular frequency. Then, the value of the virtual phase of the node of interest at the current time is transmitted when the other node transmits its timing control signal. In this manner, the phase information of the node of interest is transmitted to a third node two hops ahead of the node of interest, e.g. a node 23 lying within the dashed-line circle 25 but not included within the solid-line circle 21 in FIG. 2B, through another node one hop ahead of the node of interest, e.g. a node 27 included within the solid-line circle 21 in FIG. 2B.

While the mechanism of transmitting the phase information of the node of interest to the third node two hops ahead has been described, the phase information of any node can be likewise transmitted to a node two hops ahead. As a result, an interaction range in the transmission timing adjustment is about two hops ahead of each node, as depicted with the circle 25, FIG. 2B.

In the case of transmitting and receiving the above-described timing control signal by the telecommunications control devices and methods disclosed by the six patent publications described above, normally, the smaller the period, the smaller the communication delay.

However, there is a problem that if the period becomes smaller, the ratio of the transmission and reception interval of the timing control signal to the period will increase accordingly, and therefore the transmission efficiency of a data signal will be lowered. Therefore, in order to achieve lower delay and attain higher transmission efficiency, it is vital to make the overhead of the timing control signal as small as possible.

SUMMARY OF THE INVENTION

It is an object of the present invention to provide a telecommunications control device and a method therefor which are capable of making the overhead of a timing control signal small when autonomously calculating the transmission timing between neighboring nodes, and which are capable of achieving low delay and high data transmission efficiency.

In accordance with one aspect of the present invention, there is provided a telecommunications control device mountable on a network node constituting a telecommunications system together with a neighboring node. The telecommunications control device includes: a timing control signal receiver for receiving a timing control signal transmitted from the neighboring node with a phase indicative of data transmission timing of the neighboring node reflected; a transmission timing calculator for varying a phase state of the network node to determine data transmission timing of the network node, based on reception timing of the timing control signal of the neighboring node; a timing control signal transmitter for transmitting a timing control signal in which a phase indicative of data transmission timing of the network node determined by the transmission timing calculator is reflected; a data communicator for transmitting and receiving a data signal to and from the neighboring node; and a phase state manager for controlling transmission of the timing control signal and data signal in accordance with the phase state of the network node.

In accordance with another aspect of the present invention, there is provided a network node having the telecommunications control device mounted thereon which is described above.

In accordance with still another aspect of the present invention, there is provided a telecommunications system comprising a plurality of network nodes, each of the plurality of nodes being described above.

In accordance with yet another aspect of the present invention, there is provided a telecommunications control method in a network node constituting a telecommunications system together with a neighboring node. The telecommunications control method comprises the steps of: receiving a timing control signal transmitted from the neighboring node with a phase indicative of data transmission timing of the neighboring node reflected; varying a phase state of the network node to determine data transmission timing of the network node, based on reception timing of the timing control signal of the neighboring node; transmitting a timing control signal in which a phase indicative of the data transmission timing of the network node is reflected; transmitting and receiving a data signal to and from the neighboring node; and controlling transmission of the timing control signal and data signal in accordance with the phase state of the network node.

In accordance with a further aspect of the present invention, there is provided a telecommunications control program mountable on a network node constituting a telecommunications system together with a neighboring node. The telecommunications control program, including executable instructions as is known in the art, causes a computer to perform the functions defined by the respective steps described above.

According to the present invention, in autonomously calculating transmission timing between a network node and neighboring nodes, the overhead of a timing control signal can be made small, so that low delay and high data transmission efficiency can be achieved.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENT

A preferred embodiment of the telecommunications control device of the present invention will be hereinafter described in detail with reference to the accompanying drawings. The preferred embodiment may be applied to each of a plurality of nodes that are included in a telecommunications network system, such as a sensor network, a wireless ad hoc network, a local area network (LAN), or other kinds of network.

The preferred embodiment is specifically featured in that a method of transmitting and receiving a timing control signal is controlled depending upon whether or not a transmission timing control operation is in its convergence state. More specifically, in a non-convergence state, a procedure for transmitting and receiving a timing control signal is performed, for example, according to the method disclosed by the six patent publications described above. By contrast, in a convergence state, the transmitting and receiving procedure is performed, for example, according to a method different from what is disclosed by the six patent publications.

Figure 1:
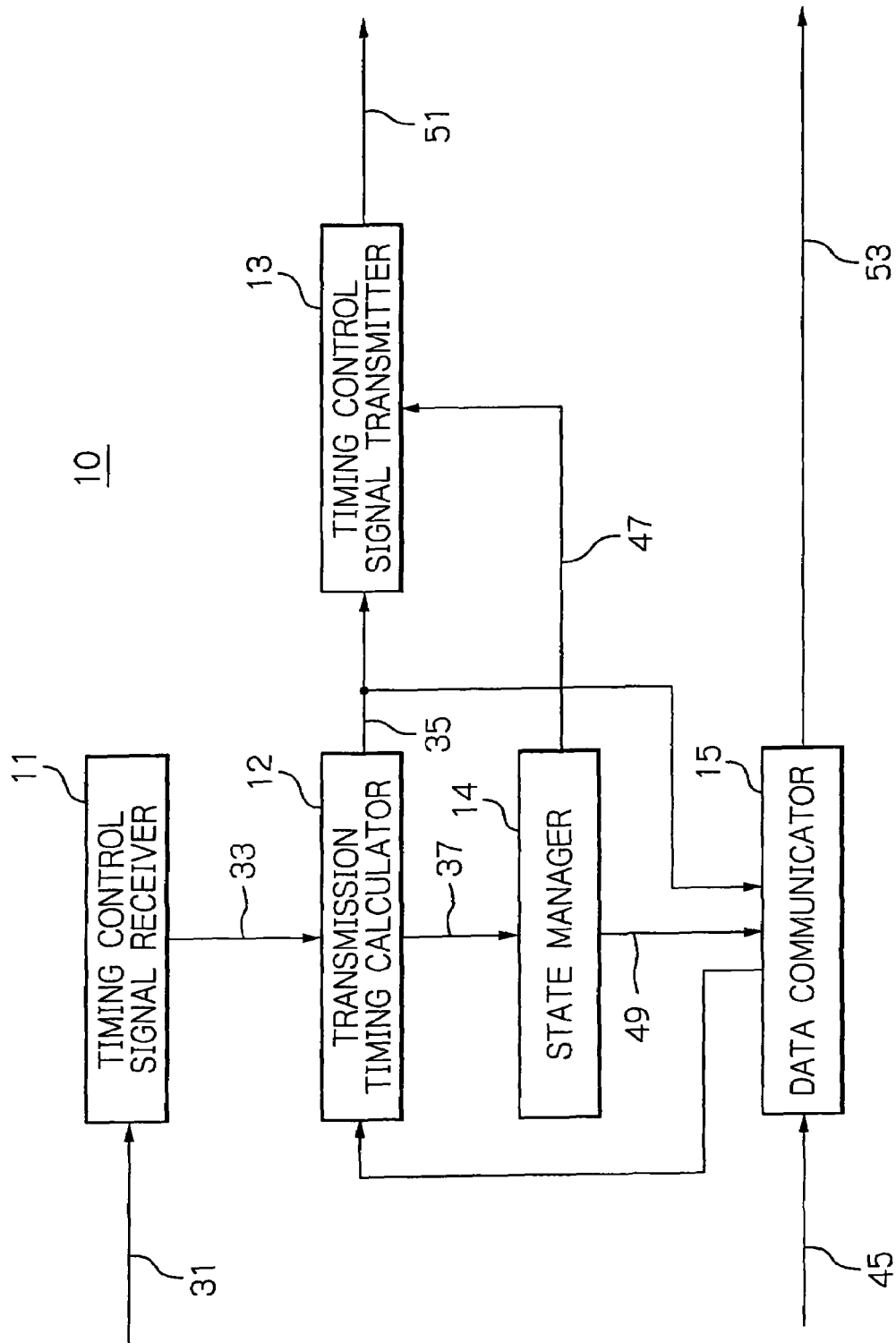
FIG. 1 is a schematic block diagram showing a preferred embodiment of a node in accordance with the present invention.

Referring now to FIG. 1, there is shown a typical configuration of a network node 10 of the preferred embodiment. In the embodiment of telecommunications network, there are a plurality of nodes 10, which may be of the same configuration as each other. As shown in the figure, the node 10 includes a timing control signal receiver 11, a transmission timing calculator 12, a timing control signal transmitter 13, a state manager 14, and a data communicator 15, which are interconnected as illustrated.

The timing control signal receiver 11 is adapted to receive as an input timing control signal a timing control signal 31 transmitted by a neighboring, e.g. another node lying within the signal range of the node of interest. The timing control signal receiver 11 is also adapted to feed the received timing control signal 33 of the neighboring node to the transmission timing calculator 12.

The transmission timing calculator 12 is adapted to receive the timing control signal 33 of the neighboring node from the timing control signal receiver 11, form on the basis of the timing control signal 33 a phase signal 35 prescribing a transmission timing at which a signal is transmitted from the own node 10, and feed the phase information 35 and 37 of the phase signal to the timing control transmitter 13 and the state manager 14, respectively.

If the phase value at time t of the phase signal of the node of interest i is represented by $\theta i(t)$, then the transmission timing calculator 12 varies the phase signal $(=\theta i(t))$ in a nonlinear oscillation rhythm, based on the timing control signal 33 of the neighboring node, as described later. This variation in the phase signal realizes the nonlinear characteristic of neighboring nodes attempting to become opposite in phase, or in oscillation phase, to each other, or attempting to become different in phase from each other, and attempts to use the characteristic for data collision avoidance. More specifically, the variation in the phase signal attempts to form an appropriate time relationship, or difference in time, in such away that the timing control signals from two neighboring nodes do not collide with each another.

The function of the transmission timing calculator 12 will be described below with reference to FIGS. 3A through 4C. Note that the state transitions depicted in FIGS. 3A through 4C are also concerned with the function of the timing control signal transmitter 13.

FIGS. 3A through 4C show a relationship between a node of interest and its neighboring node, i.e. first and second nodes, among the plurality of nodes. In other words, they illustrate how the phase relationship between the respective nonlinear oscillation rhythms varies with time.

Figure 3A:
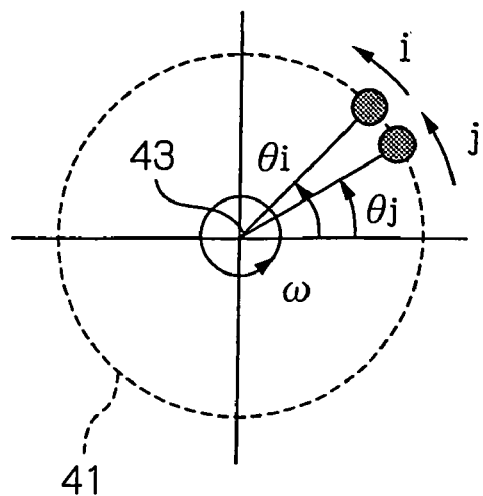
FIGS. 3A, 3B, and 3C demonstrate initial, transitional, and stable states, respectively, in which two of the plurality of nodes are tuned to each other in the illustrative embodiment.
Figure 3B:
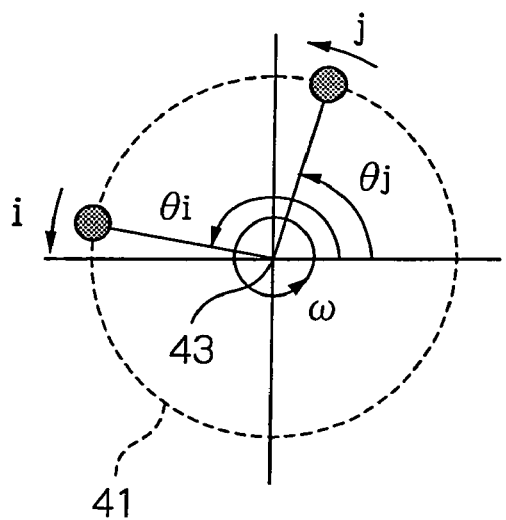
Figure 3C:
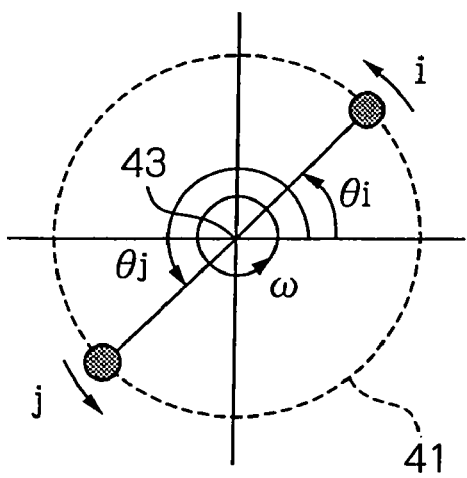

FIGS. 3A, 3B, and 3C depict the case of a first node i and a second node j interacting with each other. In these figures, two material points i and j running on a circle 41 represent the movements of nonlinear oscillation rhythms corresponding to the first and second nodes i and j, respectively. The angles θi and θj on the circle 41 of the two material points i and j represent the values of phase signals at that time, respectively. The rotational movements of the two material points i and j are projected onto the vertical or horizontal axis, and the nonlinear oscillation rhythms of the first and second nodes i and j correspond to the movements of the projected points. In accordance with the motion represented by Expression (1) described later, two material points i and j attempt to become opposite in phase to each other. As a result, even when the phases of the two material points i and j are close to each other in an initial state shown in FIG. 3A, the phase relationship therebetween passes through a transitional state shown in FIG. 3B and finally reaches a steady state shown in FIG. 3C. In the steady state, the phase difference between the two material points i and j is equal to approximately n radians.

Each of the two material points i and j revolves about the common center 43 with its basic angular velocity equal to its specific angular frequency ω, the basic velocity corresponding to a velocity at which it makes its own operating state transitive. If the two nodes i and j interact with each other upon transmission and reception of impulse signals, the material points i and j adjust their angular velocities as a result of the interaction, and finally reach a steady state in which an appropriate phase relationship is maintained. This operation can be considered as forming a stable phase relationship by mutual repulsion of the two material points i and j during revolution. In the steady state, as described later, if respective two nodes i and j transmit impulse signals at a predetermined phase, say, at a phase of zero, then the transmission timings in the two nodes i and j are to form an appropriate timing relationship therebetween in order to avoid a collision of data.

Figure 4A:
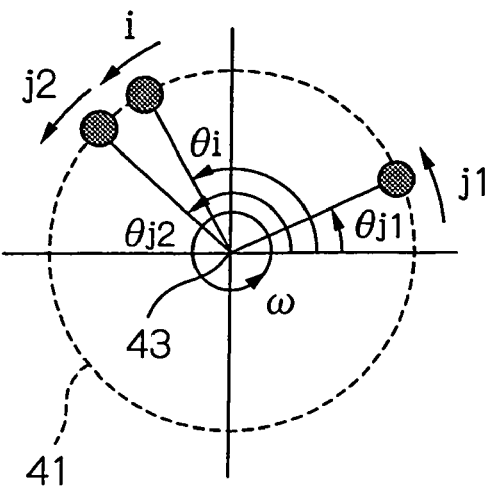
FIGS. 4A, 4B, and 4C demonstrate initial, transitional, and stable states, respectively, in which three of the nodes are tuned to each other in the illustrative embodiment.
Figure 4B:
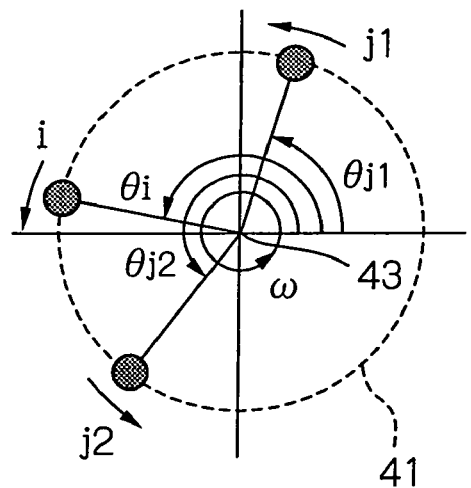
Figure 4C:
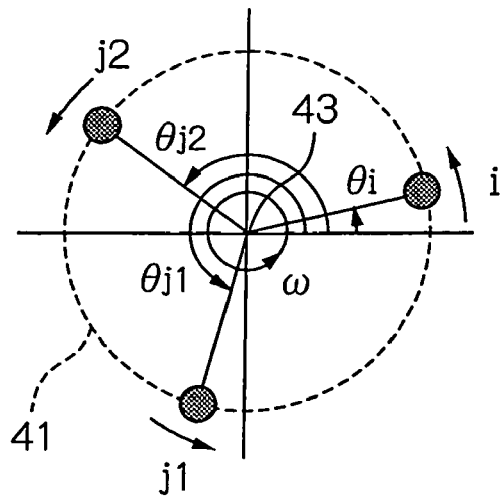

FIGS. 4A, 4B, and 4C, too, depict the case of the node of interest i and two neighboring nodes (second and third nodes) j1 and j2 interacting with one another. Even in the case of three nodes i, j1 and j2, as in the above case, the three nodes i, j1 and j2 form a stable phase relationship therebetween with respect to time by repelling one another during revolution. Note that the same principle applies to the case of four or more nodes interacting with one another.

The stable phase relationship or steady state thus established is remarkably adaptive to a change in the number of neighboring nodes. For example, assume that, when first and second nodes i and j1 are in a stable phase relationship or steady state, a third node j2 is added. Then the steady state is once destroyed, but after passing through a transitional state, a new steady state such as shown in FIG. 4C is again established. This adaptive operation is also true in the case where one of the two neighboring nodes is removed or fails.

To the detailed calculation process for timing control signals in the transmission timing calculator 12, a variety of calculation processes can be applied, for example, what are disclosed by the six patent publications described above. In the preferred embodiment, however, a form of introducing the virtual mode calculating means disclosed by the aforementioned '840 Date et al. patent will now be considered.

Specifically with reference FIG. 1 also, the transmission timing calculator 12 of the first node i, upon receiving a timing control signal 31 from the second node j, generates a virtual phase model of the transmission source node. The transmission timing calculator 12 then employs the virtual phase mode to calculate the pseudo-phase, called a virtual phase, of the second node j, and is adapted to constantly observe a phase difference between first and second nodes i and j.

Also, the transmission timing calculator 12, based on the information merged into a data signal 45 received by the data communicator 15, is adapted to confirm whether or not the data signal 45 has been transmitted instead of a timing control signal. On determining that the data signal 45 has been transmitted instead of a timing control signal, the transmission timing calculator 12, based on the timing at which the data signal was received, performs the above-described calculation process.

The state manager 14 is adapted to receive phase information 37 as the calculation result from the transmission timing calculator 12, determine whether or not transmission timing control operation is in a convergence state, and feed transmission control information as the determination result 47 and 49 to the timing control signal transmitter 13 and data communicator 15, respectively. This makes it possible to control the transmission process, depending upon whether or not the operation of transmission timing control of timing control signals and data signals is in the convergence state.

The state manager 14 determines the transmission timing control operation to be in the convergence state, if the calculation result in the transmission timing calculator 12 does not change for a predetermined time interval. The predetermined time interval for determining the convergence state may be determined by experiment. That is, the state manager 14 determines the transmission timing control operation to be in the convergence state, if a rate of change or speed of change of the phase state of its own node, i.e. first node, does not change for a predetermined time interval.

The timing control signal transmitter 13 is adapted to receive phase information 35 from the transmission timing calculator 12 and, based on the phase information 35, transmit an output timing control signal 51.

Regarding the transmission of a timing control signal, if a phase signal reaches a predetermined phase a, where $0 \leq \alpha < 2\pi$, every period, the timing control signal transmitter 13 transmits an output timing control signal 51. It is preferable that the predetermined phase α be uniform throughout the entire system. In the following description, the predetermined phase α is assumed to be zero in the entire system. For instance, as in the case of FIG. 3C, the phase signals of first and second nodes i and j are shifted in phase from each other by π in the steady state. Therefore, even if the phase α is assumed to be zero in the entire system, the transmission timing of the output timing control signal from the first node i is shifted from the transmission timing of the output timing control signal from the second node j by π.

In addition, upon receiving transmission control information 47 indicative of a convergence state from the state manager 14, the timing control signal transmitter 13 transmits a timing control signal 51 at the ratio of one to N periods, where N is a positive integer. More specifically, in the case of a non-convergence state, a timing control signal 51 is transmitted for each period if a phase signal reaches a predetermined phase. In the case of a convergence state, a timing control signal 51 is transmitted at the ratio of one to N periods.

The data communicator 15 is adapted to transmit observation data and/or an input data signal as an output data signal 53 to another node.

In the steady state, the data communicator 15 performs this transmission in a time slot that is to be described later. Although the time slot is not a fixed time interval allocated by a system, etc., the term "time slot" is employed. In a transitional state, the data communicator 15 stops a transmission operation. Note that the data communicator 15 may transmit an output data signal 53 in the same frequency band as the output timing control signal.

The data communicator 15, upon receiving transmission control information 49 indicative of a convergence state from the state manager 14, transmits a data signal 53 instead of a timing control signal during the time that the timing control signal 51 is transmitted. At this time, a data signal to be transmitted contains identification information indicating that it has been transmitted instead of a timing control signal.

More specifically, upon the determination of a convergence state by the state manager 14, the timing control signal transmitter 13 transmits a timing control signal 51 at the ratio of one to N periods, as set forth above. Accordingly, the data communicator 15 transmits a data signal 53 instead of a timing control signal during the remaining (N−1) periods in which no timing signal is transmitted.

More specifically, the time slot mentioned above is a time interval of $\delta_1 \leq \theta i(t) \leq \beta_1 - \delta_2$, where $\theta i(t)$ is the phase of a phase signal. The start of the time slot, at which the value of the phase signal is $\delta_1$, is the instant at which the transmission of an output timing control signal is completed, while the end of the time slot, at which the value of the phase signal is $\beta_1 - \delta_2$, is a point that is $\delta_2$ before the instant ($\beta_1$) at which a timing control signal from a second node is first received for each period of the phase signal. The values $\delta_1$ and $\delta_2$ are defined as a phase width that corresponds to a very short time interval for assuring that timing control and data signals, transmitted from a first or a second node, will not exist at the same time in the radio space near the first node. The values $\delta_1$ and $\delta_2$ may be experimentally determined, for example, under the installation of a plurality of nodes.

For instance, in the case of a non-convergence state, in FIGS. 3A, 3B and 3C, the first node i transmits a timing control signal before the phase $\beta_i$ gets from zero to $\delta_1$, but in a steady state such as the one shown in FIG. 3C, the data communicator 15 transmits data signals during a time interval before the phase $\theta_i$ gets from zero to $\delta_1$ and during a time interval of $\beta_1 - \delta_2$.

Figure 5:
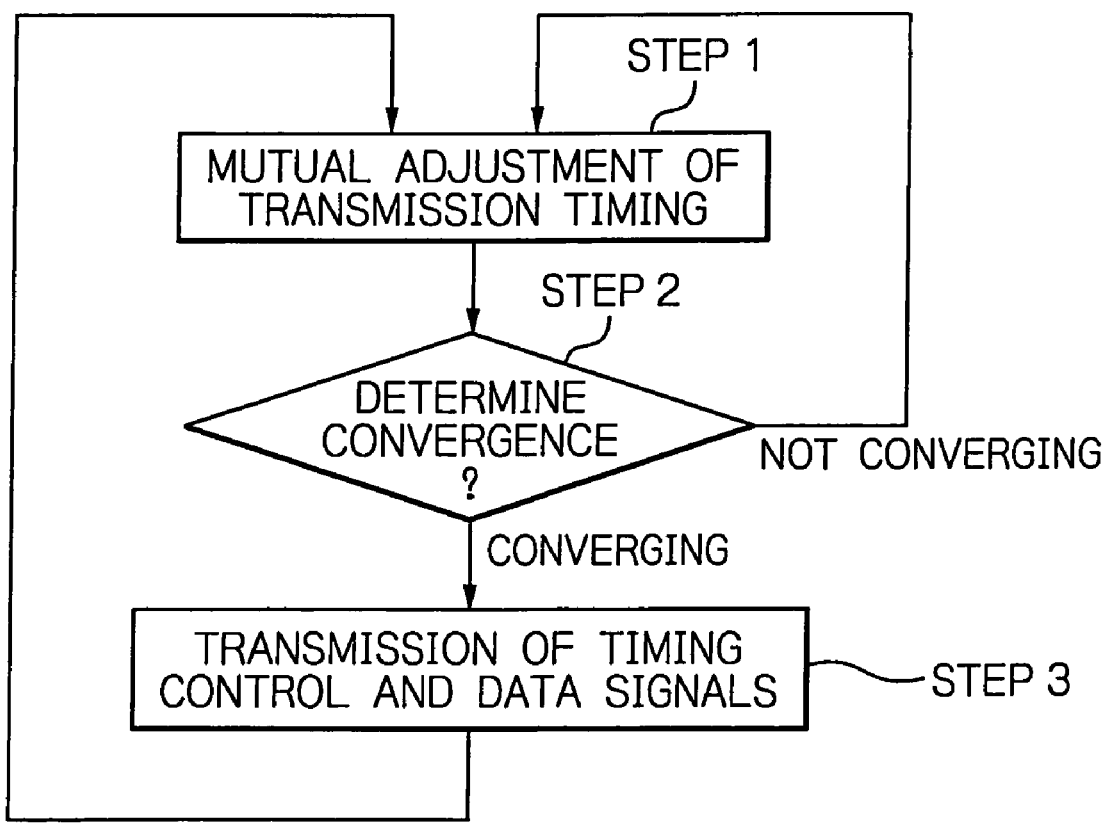
FIG. 5 is a flowchart useful for understanding a transmission timing control process that is performed in each node of the illustrative embodiment.

Further with reference to FIG. 5, the operation of the telecommunications control system will now be described in detail, in which a timing control signal is transmitted and received between first and second nodes, then each node autonomously determines the transmission timing of a data signal, and then data transmission is performed between the first and second nodes.

Figure 2A:
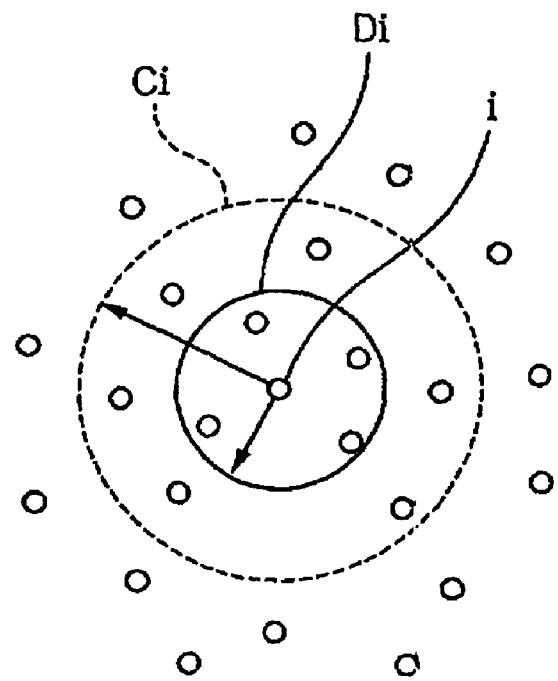
FIGS. 2A and 2B are explanatory diagrams for use in describing the configuration of a network including a plurality of nodes dispersedly disposed and how a timing control signal is transmitted.
Figure 2B:
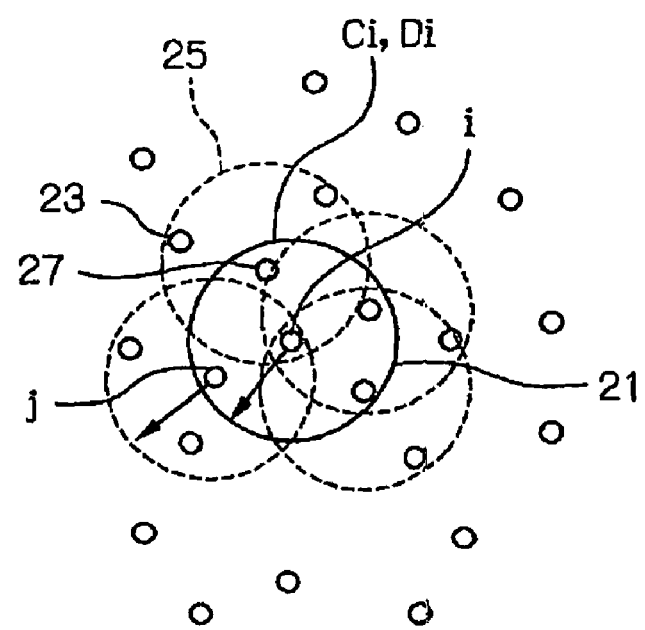

Below, a description will be given on the assumption that a plurality of nodes 10 with the telecommunications control system shown in FIG. 1 are dispersedly disposed in space, and the situation shown in FIG. 2B is proceed to when transmitting and receiving a timing control signal between neighboring nodes, i.e. first and second nodes. Note that the plurality of nodes 10 execute the operation hereinafter described separately from each other.

The mutual adjustment process for transmission timing is performed in step 1 to read as follows. First, first one i of a plurality of nodes 10 dispersedly disposed as shown in FIG. 2B executes a mutual adjustment operation of transmission timing by transmitting and receiving a timing control signal 51 to and from second one j of the nodes 10 that lies in a one-hop neighborhood range 21. The transmission timing calculator 12, upon executing the transmission timing adjustment operation, feeds the calculation result information 37 to the state manager 14 and also feeds the calculated phase information 35 and 49 to the timing control signal transmitter 13 and data communicator 15, respectively.

The mutual adjustment operation of transmission timing between nodes 10 is executed by adjusting the transmission timing of the timing control signal 51 of the first node i based on the calculation process of the transmission timing calculator 12 of each node 10. In the preferred embodiment, the transmission timing calculator 12 employs the form of introducing a virtual node mode calculation means disclosed by the aforementioned '840 Date et al. patent.

More specifically, virtual phases of other nodes j that exist in a one-hop neighborhood range 21 are merged into a timing control signal 51 that is transmitted by the first node i. Consequently, each node 10 receives timing control signals 31 from other nodes 10 that exist in the one-hop neighborhood range 21 and acquires the virtual phases merged into the timing control signals 31, thereby being able to indirectly obtain phase information of other nodes, e.g. 23, in a two-hop neighborhood range from the node i in question.

The transmission timing calculator 12 employs the phase information of other nodes 10 in the two-hop neighborhood range acquired at the reception timing of the timing control signal 31 to generate a virtual phase mode of the first node i, and then adjusts the value of the virtual phase each time a timing control 31 is received. The transmission timing calculator 12 executes calculations, employing the virtual phases of other nodes 10 that exist in the two-hop neighborhood range.

Below, an example of the calculation process in the transmission timing calculator 12 will be described. The calculation process in the transmission timing calculator 12 can be performed, employing expressions that model a system in which nonlinear oscillators indicated by the following Expressions (1.1) and (1.2) are coupled:

$$d\theta_i(t)/dt = \omega i + (K/N\hat{i})\Sigma^{N\hat{i}}_{j=1} R(\Delta\theta\hat{}_{ij}(t)) + \xi(S_i(t)) \quad (1.1)$$

$$\Delta\theta\hat{}_{ij}(t) = \theta\hat{}_{ij}(t) - \theta_i(t) \quad (1.2)$$

In Expressions (1.1) and (1.2), a variable t represents time, and a variable $\theta_i(t)$ represents the phase of the first node i at time t.

The phase $\theta_i(t)$ is replaced by its remainder after division by $2\pi$ (modulo $2\pi$ arithmetic) so that it always has a value of $0 \leq \theta_i(t) < 2\pi$. The symbol d/dt represents a derivative with respect to time t, and $d\theta_i(t)/dt$ is a derivative of the phase $\theta_i(t)$ with respect to time t and represents a state variable.

The variable $\Delta\theta\hat{}_{ij}(t)$ represents a phase difference between a virtual phase $\theta\hat{}_{ij}(t)$ of a second node j and the phase $\theta_i(t)$ of a first node i. For convenience, the value of the addition of $2\pi$ to the phase difference $\Delta\theta\hat{}_{ij}(t)$ is replaced with its remainder after division by $2\pi$ (modulo $2\pi$ arithmetic) so the phase difference $\Delta\theta\hat{}_{ij}(t)$ has a value of $0 \leq \Delta\theta\hat{}_{ij}(t) < 2\pi$.

The notation $\omega_i$ is a specific angular frequency parameter and represents the basic rhythm of the nonlinear oscillation of each node i. By way of example, the value of $\omega_i$ is assumed to have been set at the same value beforehand in all nodes 10.

The function $R(\Delta\theta\hat{}_{ij}(t))$ is a phase response function that expresses a response characteristic for varying the oscillation rhythm of a first node i in accordance with the phase difference $\Delta\theta\hat{}_{ij}(t)$. The function $R(\Delta\theta\hat{}_{ij}(t))$ has a nonlinear characteristic that repels the phase $\theta_i(t)$ of a first node i from the virtual phase $\theta\hat{}_{ij}(t)$ of a second node j. As specific examples of the function form of the phase response function $R(\Delta\theta\hat{}_{ij}(t))$, existing function forms can be used. By way of example, the function forms disclosed by the aforementioned six patent publications can be used.

The N^i in the second term on the right-hand side of Expression (1.1) represents the sum total of virtual phase models at time t, and the K represents a coupling coefficient parameter. The coupling coefficient parameter K is a parameter for determining the contribution of the second term on the right-hand side of Expression (1.1) to the time evolution of the phase $\theta_i(t)$, and its value may be experimentally determined.

The function $\xi(S_i(t))$ is a term that, when a relative phase difference between a first node i and a second node j is small, cumulates stress and produces a phase shift of random magnitude in accordance with a stress value $S_i(t)$ cumulated. The relative phase difference is defined by the following Expressions:

$$E = \Delta\hat{\theta}_{ij}(t) \text{ when } \Delta\hat{\theta}_{ij}(t) \leq \pi \tag{2.1}$$

$$E = 2\pi - \Delta\hat{\theta}_{ij}(t) \text{ when } \Delta\hat{\theta}_{ij}(t) > \pi \tag{2.2}$$

where $\Delta\hat{\theta}_{ij}(t)$ represents the phase difference and E represents the relative phase difference.

More specifically, the function $\xi(S_i(t))$ represents a response characteristic to the cumulated stress value $S_{i1}(t)$ As the function form of the function $\xi(S_i(t))$, existing function forms can be employed. By way of example, the function forms disclosed by the aforementioned six patent publications can be widely employed.

Expressions (1.1) and (1.2) can be solved using a numerical approximation technique for solving differential equations, such as the Runge-Kutta method, and may be installed in each node as software. The Runge-Kutta method is of calculating changes (time evolution) in state variables by using difference equations (i.e. recurrence equations) obtained from differential equations by dividing a continuous time variable t into discrete time intervals. As with the forms disclosed by the aforementioned '826 Date et al. patent, using difference equations obtained from differential equations by other methods simpler than the Runge-Kutta method, it is also possible to calculate changes in state variables. Further, if electronic circuitry is configured to perform the same operation as Expressions (1.1) and (1.2), then it can also be installed in each node 10 as hardware.

The convergence determination process will be performed in step 2 as follows. In each node 10, the transmission timing calculator 12 performs the process of adjusting timing control signals mutually, as described in respect of step 1.

Next, the state manager 14 determines, based on the calculation result 37 of the transmission timing calculator 12, whether or not the timing control operation has reached the convergence state, i.e. steady state, and feeds the transmission control information 47 and 49 based on the determination result to the timing control signal transmitter 13 and data communicator 15, respectively.

As the method of determination by the state manager 14, for instance, when the calculation result of the right-hand side of the above-described Expression (1.1) does not change for a predetermined time interval, the state manager 14 determines the timing control operation to be in the convergence state. The predetermined time interval may be experimentally determined. The calculation result of the right-hand side of Expression (1.1) not changing for the predetermined time interval means that the rate of change of the phase state of a first node i does not change for the predetermined time interval, and represents that the speed of change of the phase state is in the steady state.

As a predetermined result of the determination process, on determining the timing control operation to be in the convergence state, the state manager 14 performs the subsequent step 3. By contrast, upon determining the operation to be in the non-convergence state, the state manager 14 continues the operation of step 1.

The convergence determination process in the state manager 14 is repeatedly performed every predetermined time interval. The predetermined time interval may be set at the same value as the time increment width $\Delta t$ used in obtaining difference equations from Expressions (1.1) and (1.2).

Furthermore, even when the state manager 14 advances to step 3 once, it returns to step 1 and repeats the adjustment process, if the timing control operation is determined to be in the non-convergence state as a result of the convergence determination process.

The process of transmitting timing control and data signals will be performed in step 3 as follows. On determining the timing control operation to be in the convergence state on the basis of the calculation result 37 of the transmission timing calculator 12, the state manager 14 feeds transmission control information 47 and 49 indicating that effect to the timing control signal transmitter 13 and data communicator 15, respectively.

Upon receiving the transmission control information 47 and 49 indicative of a convergence state, the timing control signal transmitter 13 and data communicator 15 transmit a timing control signal 51 and a data signal 53, respectively.

When the state manager 14 determines the timing control operation to be in the convergence state, the timing control signal transmitter 13 transmits a timing control signal 51 at the ratio of one to N periods, while the data communicator 15 transmits a data signal 53 instead of a timing control signal for the remaining (N−1) periods.

The value of N may be experimentally determined. Note that a data signal 53 which is transmitted instead of a timing control signal contains identification information indicative of a substitute for a timing control signal.

Data signals, for example, which may be of packets, etc., carry data intended for specific communication between nodes, such as sensor data, and do not include control information such as the phase information of a neighboring node.

As set forth above, the process relating to the transmission control of timing control and data signals is executed in FIG. 1 by the state manager 14. The state manager 14 generates transmission control information 47 and 49 in the convergence determination process, and feeds the transmission control information 47 and 49 to the timing control signal transmitter 13 and data communicator 15, respectively.

When a first node i receives a timing control signal 31 from a second node j lying in a one-hop neighborhood range 21, the first node i can indirectly obtain the phase information of a third node 23 two hops ahead. By contrast, when the first node i receives a data signal 45 that is a substitute for a timing control signal, it cannot obtain the phase information of a third node 23 two hops ahead.

However, even in the latter case, the first node i is able to obtain the phase information of the second node j lying in the one-hop neighborhood range 21. This is because the reception timing represents the phase of the second node j.

Therefore, in transmitting a data signal 53 as a substitute for a timing control signal, if the data signal is given identification information and transmitted, even in the case of employing a method of transmitting and receiving a timing control signal and a data signal instead of the timing control signal, the first node i can acquire the phase information of the second node j lying in the one-hop neighborhood range 21 every period. By contrast, the first node i can obtain the phase information of the third node 23 two hops ahead at the ratio of one to N periods. In the latter case, the first node i executes the following operation.$$

Upon receiving a timing control signal 31 from the second node j lying in the one-hop neighborhood range 21, the first node i adjusts the value of the virtual phase of the third node 23 lying in the two-hop neighborhood range 25, as in step 1.

Upon receiving a data signal from the second node j lying in the one-hop neighborhood range 21, the first node i determines whether or not identification information has been merged into the data signal, thereby determining whether or not the data signal is a substitute for a timing control signal.

When it is a substitute for a timing control signal, the first node i adjusts the value of the virtual phase of the second node j based on the reception timing. When it is not a substitute for a timing control signal, the first node i does not perform the virtual phase adjustment described above.

As in step 1, the first node i executes the calculation process in the transmission timing calculator 12, employing the value of the virtual phase of the third node 23 lying in the two-hop neighborhood range 25.

As has been described hereinabove, in the convergence state, the frequency of the transmission of a timing signal is reduced to the ratio of one to N periods, whereby the overhead concerned with the transmission and reception of a timing control signal is made small. In addition, using a data signal which is a substitute for a timing control signal, the phase information of a neighboring node j lying in the one-hop neighborhood range 21 is obtained every period. Because the timing control operation has already been in the convergence state, even when the value of the virtual phase of a third node 23 laying in the two-hop neighborhood range 25 that is thus obtained is employed, transmission timing control can be maintained with a high degree of accuracy. Consequently, the ratio of the transmission and reception interval of a timing control signal to one period is reduced, so that the transmission efficiency of a data signal is enhanced. Particularly, when a period is comparatively small, the effect is great.

According to the preferred embodiment, in the data telecommunication system where a plurality of nodes 10 transmit and receive timing control signals to adjust transmission timing autonomously, by providing the function of changing the transmission and reception form of timing control and data signals in dependent upon whether or not the transmission timing control operation is in the convergence state, the ratio of the transmission and reception interval of a timing control signal to one period is reduced and therefore the transmission efficiency of a data signal is enhanced. Particularly, when a period is comparatively small, the effect is great.

It is noted that the form of a timing control signal to be transmitted and received between nodes is not specifically limited to that of the illustrative embodiment, so long as it can transmit a particular timing. The simplest example of a timing control signal is a single pulse that has a function waveform such as a Gaussian waveform, a rectangular waveform, and the like. However, a timing control signal need not always be a single pulse, but two or more pulses may be used to constitute a timing control signal that forms one meaning. For instance, a pulse train corresponding to a particular bit pattern can be handled as one impulse signal. Such a case is effective when, under the environment where many noise signals are present, it is difficult to identify signals with a single pulse. While the timing control signal in the preferred embodiment of the present invention conceptually indicates a particular timing, the timing control signal may be implemented in various manners.

A merged signal of the above-described timing control signal, indicative of a particular timing, and some type of data such as a node identification number may be used as an impulse signal. Note that such a merged signal may also be implemented in various manners.

The transmission timing calculator 12 may also take various forms insofar as they generate phase signals.

The preferred embodiment is applied to the system in which two or more nodes dispersedly disposed in space transmit and receive data by radio. However, the present invention is not to be interpreted as being limited to such a wireless communication system. The present invention is also applicable to systems in which a great number of nodes dispersed disposed in space transmit and receive data over wires. For instance, the present invention is likewise applicable to wired local area networks (LANs) such as an Ethernet (trade name) network. Moreover, the present invention may be applied to networks in which different categories of nodes, such as wired sensor nodes, actuator nodes, and server nodes, exist together. It is a matter of course that the present invention can be applied to networks in which wired and wireless nodes exist together.

Furthermore, the present invention can be used as a communication protocol for routers to interchange routing tables at different timings on the Internet. The router is a device that selects an appropriate pathway for information and routes the information accordingly. The routing table is a pathway selection rule which is referred to when routing information to its destination. In order to achieve efficient communication, it is necessary to keep updating the routing tables in response to changes in network topology, local traffic changes, and so forth. Because of this, routers in a network interchange routing tables at predetermined intervals. However, as disclosed by S. Floyd et al., "The Synchronization of Periodic Routing Message," *IEEE/ACM Trans. Networking*, Vol. 2, No. 2, pp. 122 to 136, April 1994, it has been found that even if routers transmit routing tables to each other at different timings, these transmission timings will be gradually synchronized, or collide, with each other. S. Floyd et al. has proposed a method of coping with this problem by giving random variation to the processing period of each node with respect to a communication protocol used for exchanging routing tables, and indicated that the method produces a certain effect. However, the method disclosed by S. Floyd et al. depends upon only randomness basically, so that it is partially effective.

In contrast, if the present invention is applied to the above-described problem, it is then possible for neighboring routers to autonomously adjust time slots in which they transmit routing tables therebetween. Consequently, the transmission timings of the routers differ from one another. Thus, the present invention is capable of gaining a higher effect than the method taught by S. Floyd et al.

As has been described hereinbefore, the present invention is able to deal with the problem of data collision and synchronization involved in various networks, regardless of whether they are wireless or wired systems. Therefore, the present invention can be exploited as a communication protocol that realizes efficient data communication having adaptability and stability.

As to the acquisition of transmission timing information, such as the phase signals in the preferred embodiment, the timing information may be variously used in communication. For instance, in the case where nodes transmit data signals at difference frequencies, they may communicate with one another without allocating time slots. Even in this case, they may use transmission timing information to determine when to initiate data communication.

As an alteration of changing the transmission and reception form of timing control and data signals, the number of times that a timing control signal is transmitted may be changed in accordance with the amount of time the convergence state is continued.

For example, when the continued time of the convergence state is t1, a timing control signal is transmitted at the ratio of one to N periods, and when the continued time of the convergence state is t2 ($t2 \geq t1$), a timing control signal is transmitted at the ratio of one to (N+m) periods, where m is a positive integer, so that the number of times that a timing control signal is transmitted is further reduced.

Thus, by further changing the transmission and reception form of timing control and data signals in accordance with the continued time of the convergence state, the data-signal transmission efficiency can be further enhanced.

The functions of the nodes described with reference to the preferred embodiment can be implemented in the form of software. However, if circuitry can be formed to have the same functions as the node, then it may be mounted on those nodes as hardware.

The entire disclosure of Japanese patent application No. 2007-160231 filed on Jun. 18, 2007, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A telecommunications control device mountable on a network node constituting a telecommunications system together with a neighboring node, comprising:
   a timing control signal receiver for receiving a timing control signal transmitted from the neighboring node with a first phase indicative of data transmission timing of the neighboring node reflected;
   a transmission timing calculator for varying a phase state of the network node, based on the timing of reception of the timing control signal of the neighboring node, to determine data transmission timing of the network node;
   a timing control signal transmitter for transmitting a timing control signal in which a second phase indicative of data transmission timing of the network node is reflected, said second phase being determined by said transmission timing calculator;
   a data communicator for transmitting, and receiving a data signal to and from the neighboring node; and
   a phase state manager for controlling transmission of the timing control signal and the data signal in accordance with the phase state of the network node, wherein
   said phase state manager, upon determining the phase state of the network node to be in a convergence state, reduces a time interval during which the timing control signal is transmitted, and transmits the data signal as a substitute for the timing control signal, and
   said data communicator, under control of said phase state manager, merges information indicative of the substitute for the timing control signal into the data signal and transmits the merged signal.

2. The device in accordance with claim 1, wherein said transmission timing calculator, when confirming the information merged into a data signal received, determines data transmission timing of the network node based on reception timing of the received data signal.

3. The device in accordance with claim 2, wherein said transmission timing calculator calculates a virtual phase state of the neighboring node, based on the timing control signal transmitted from the neighboring node and the data signal transmitted as a substitute for the timing control signal from the neighboring node.

4. The device in accordance with claim 1, wherein said phase state manager determines the phase state of the network node to be in a convergence state when a rate of change or a speed of change of the phase state of the network node does not change for a predetermined time interval.

5. The device in accordance with claim 1, wherein said transmission timing calculator confirms that the information merged into a data signal has been received by the data communicator, and determines the data transmission timing of the network node based on the timing of reception of the data signal.

6. A network node having a telecommunications control device mounted thereon and constituting a telecommunications system together with a neighboring node, said device comprising:
   a timing control signal receiver for receiving a timing control signal transmitted from the neighboring node with a first phase indicative of data transmission timing of the neighboring node reflected;
   a transmission timing calculator for varying a phase state of said network node, based on the timing of reception of the timing control signal of the neighboring node, to determine data transmission timing of said network node;
   a timing control signal transmitter for transmitting a timing control signal in which a second phase indicative of data transmission timing of said network node is reflected, said second phase being determined by said transmission timing calculator;
   a data communicator for transmitting and receiving a data signal to and from the neighboring node; and
   a phase state manager for controlling transmission of the timing control signal and the data signal in accordance with the phase state of said network node, wherein
   said phase state manager, upon determining the phase state of the network node to be in a convergence state, reduces a time interval during which the timing control signal is transmitted, and transmits the data signal as a substitute for the timing control signal, and
   said data communicator, under control of said phase state manager, merges information indicative of the substitute for the timing control signal into the data signal and transmits the merged signal.

7. A telecommunications system comprising a plurality of network nodes, each of the plurality of network nodes having a telecommunications control device mounted thereon, said device comprising:
   a timing control signal receiver for receiving a timing control signal transmitted at least from neighboring one of the plurality of network nodes with a first phase indicative of data transmission timing of the neighboring network node reflected;
   a transmission timing calculator for varying a phase state of said network node on which said device is mounted, based on the timing of reception of the timing control signal of the neighboring network node, to determine data transmission timing of said network node on which said device is mounted;
   a timing control signal transmitter for transmitting a timing control signal in which a second phase indicative of data transmission timing of said network node on which said device is mounted is reflected, said second phase being determined by said transmission timing calculator is reflected;
   a data communicator for transmitting and receiving a data signal to and from the neighboring network node; and
   a phase state manager for controlling transmission of the timing control signal and the data signal in accordance with the phase state of said network node on which said device is mounted, wherein said phase state manager, upon determining the phase state of the network node to be in a convergence state, reduces a time interval during which the timing control signal is transmitted, and transmits the data signal as a substitute for the timing control signal, and said data communicator, under control of said phase state manager, merges information indicative of the substitute for the timing control signal into the data signal and transmits the merged signal.

8. A telecommunications control method in a network node constituting a telecommunications system together with a neighboring node, comprising the steps of:

receiving a timing control signal transmitted from the neighboring node with a first phase indicative of data transmission timing of the neighboring node reflected;

varying a phase state of the network node based on the timing of reception of the timing control signal of the neighboring node to determine data transmission timing of the network node;

transmitting a timing control signal in which a second phase indicative of the data transmission timing of the network node is reflected;

transmitting and receiving a data signal to and from the neighboring node; controlling transmission of the timing control signal and the data signal in accordance with the phase state of the network node;

reducing, upon determining the phase state of the network node to be in a convergence state, a time interval during which the timing control signal is transmitted, and transmitting the data signal as a substitute for the timing control signal; and merging information indicative of the substitute for the timing control signal into the data signal and transmitting the merged signal.

9. A network node constituting a telecommunications system together with a neighboring node, the network node comprising:

means for receiving a timing control signal transmitted from the neighboring node with a first phase indicative of data transmission timing of the neighboring node reflected;

means for varying a phase state of the network node based on the timing of reception of the timing control Signal of the neighboring node to determine data transmission timing of the network node;

means for transmitting a timing control signal in which a second phase indicative of the data transmission timing of the network node is reflected;

means for transmitting and receiving a data signal to and from the neighboring node; and means for controlling transmission of the timing control signal and the data signal in accordance with the phase state of the network node;

means for reducing, upon determining the phase state of the network node to be in a convergence state, a time interval during which the timing control signal is transmitted, and to transmit the data signal as a substitute for the timing control signal; and means for merging information indicative of the substitute for the timing control signal into the data signal and transmitting the merged signal.

* * * * *